(12) United States Patent
Hsia (10) Patent No.: US 6,701,547 B2
(45) Date of Patent: *Mar. 9, 2004

(54) FOLDABLE FRAME FOR BASSINET, PLAYYARD, PEN, STROLLER, AND THE LIKE

(76) Inventor: Ben M. Hsia, 19401 Business Center Dr., Northridge, CA (US) 91324

( * ) Notice: Subject to any disclaimer, the term of this patent is extended or adjusted under 35 U.S.C. 154(b) by 0 days.

This patent is subject to a terminal disclaimer.

(21) Appl. No.: 10/016,030

(22) Filed: Dec. 12, 2001

(65) Prior Publication Data

US 2003/0106149 A1 Jun. 12, 2003

(51) Int. Cl.⁷ .................. A47D 13/06; A47D 07/00
(52) U.S. Cl. .................................... 5/99.1; 5/98.1
(58) Field of Search ............... 5/99.1, 93.2, 94, 5/95, 97, 98.1, 98.2, 98.3

(56) References Cited

U.S. PATENT DOCUMENTS

| | | | | |
|---|---|---|---|---|
| 2,226,606 A | * | 12/1940 | Giles ........................ | 5/114 |
| 2,672,627 A | * | 3/1954 | Hagelfeldt ................ | 5/98.1 |
| 3,349,413 A | * | 10/1967 | Merelis ..................... | 5/94 |
| 3,419,309 A | * | 12/1968 | Smith ....................... | 297/452.41 |
| 4,635,305 A | * | 1/1987 | Wyss ........................ | 5/99.1 |
| 4,683,600 A | * | 8/1987 | Beger ....................... | 5/99.1 |
| 5,193,234 A | * | 3/1993 | Joaquin ..................... | 5/99.1 |
| 5,539,957 A | * | 7/1996 | Schmidt .................... | 16/331 |
| 5,584,105 A | * | 12/1996 | Krauss ...................... | 24/614 |
| 5,802,634 A | * | 9/1998 | Onishi et al. .............. | 5/93.2 |
| 6,370,715 B1 | * | 4/2002 | Morton ..................... | 5/655 |
| 6,386,986 B1 | * | 5/2002 | Sonner et al. ............. | 472/119 |
| 6,390,555 B2 | * | 5/2002 | Wilkins et al. ............ | 297/354.13 |
| 6,470,515 B1 | * | 10/2002 | Hsia ......................... | 5/99.1 |
| 6,574,812 B2 | * | 6/2003 | Jakubowski et al. ...... | 5/658 |
| 2002/0175551 A1 | * | 11/2002 | Hsia ......................... | 297/452.4 |

FOREIGN PATENT DOCUMENTS

GB            2244211 A   *  11/1991   ............ A47C/1/00

* cited by examiner

*Primary Examiner*—J.J. Swann
*Assistant Examiner*—Thomas Ho
(74) *Attorney, Agent, or Firm*—Raymond Y. Chan; David and Raymond Patent Group (57) ABSTRACT

A foldable frame includes a supporting frame, which is adapted for supporting a boundary shelter thereto, including a pair of first supporting arms in a parallel manner and a pair of second supporting arms connected to the first supporting arms end to end respectively, a pair of U-shaped folding arms each having two upper ends pivotally connected to the two first supporting arms respectively, and a securing device attached between each bottom portion of the folding arms and each of the second supporting arms of the supporting frame to retain an unfolded distance between the two bottom portions of the folding arms.

13 Claims, 10 Drawing Sheets

FOLDABLE FRAME FOR BASSINET, PLAYYARD, PEN, STROLLER, AND THE LIKE

BACKGROUND OF THE PRESENT INVENTION

1. Field of Invention

The present invention relates to baby's accessories, and more particularly to a foldable frame for a bassinet, playyard, pen, stroller, and the like, wherein the foldable has a rigid, simple, and strong structure to evenly distribute and support a downward force of a user's weight in economic cost.

2. Description of Related Arts

Baby's accessories such as bassinet, playpen, and stroller are known in art and become necessities to every family having a baby or young child. Generally speaking, there are two kinds of baby's accessories, which are foldable and non-foldable. Most non-foldable baby's accessories provide rigid frame structures for supporting the baby. However, they are bulky and occupy relatively large storage spaces, and are therefore hardly appreciated and liked by city-dwellers. Foldable baby's accessories generally occupy smaller storage spaces and are therefore preferred by the city-dwellers. However, such foldable baby's accessory has several drawbacks.

For example, in order to fold up a bassinet, a plurality of joints and couplers are employed to interconnect the adjoining ends of the frame sections which, in turn, confine looped frames for forming a bassinet frame. Moreover, locking devices are employed to prevent folding of the adjoining frame sections. However, accidental actuation of the locking device may occur, thereby resulting in folding of the frame sections relative to each other, which action may injure a child playing in the foldable bassinet.

Thus, in order to enhance the foldable ability of the bassinet, more joints must be employed such that the bassinet can be folded up in a compact unit for carriage and storage. However, the complicated foldable frame will highly increase the manufacturing cost of the bassinet and weaken the rigid structure of the frame. Furthermore, it is a hassle for a user, such as parent, to manipulate the folding and unfolding operations of the bassinet.

SUMMARY OF THE PRESENT INVENTION

The main object of the present invention is to provide a foldable frame specifically incorporated with a baby's accessories such as a bassinet, playyard, pen, stroller, or the like, which has a rigid, simple, and strong structure to evenly distribute and support a downward force of a user's weight in a lower cost.

Another object of the present invention is to provide a foldable frame for bassinet, playyard, pen, stroller, or the like, which comprises a securing device not only can securely lock up the foldable frame in the unfolded position for preventing the foldable frame being folded up accidentally but also can firmly attach the foldable frame to the fabric container of the bassinet, playpen, or the stroller.

Another object of the present invention is to provide a foldable frame for bassinet, playyard, pen, stroller, or the like, which can be quickly and easily folded into a compact unit for carriage and storage and unfolded for use. In other words, the present invention does not require a relatively large the storage space in comparison with the conventional foldable frame, so as to minimize the cost of shipping and handling of the present invention.

Another object of the present invention is to provide a foldable frame for bassinet, playyard, pen, stroller, or the like, wherein folding operation of the foldable frame is easy and fast that an individual is able to unfold or fold up the foldable frame.

Another object of the present invention is to provide a foldable frame specifically for bassinet, which comprises an adjustable back support arrangement to provide a better back support to a user's back so that the user is capable of lying in the bassinet.

Another object of the present invention is to provide a foldable frame for bassinet, playyard, pen, stroller, or the like, wherein no expensive or complicate structure is required to employ in the present invention in order to achieve the above mentioned objects. Therefore, the present invention successfully provides an economic and efficient solution for providing rigid configuration for the bassinet, playpen, stroller, or the like.

Accordingly, in order to accomplish the above objects, the present invention provides a foldable frame, comprising:

a supporting frame, which is adapted for supporting a boundary shelter thereto, comprising a pair of first supporting arms in a parallel manner and a pair of second supporting arms connected to the first supporting arms end to end respectively;

a pair of U-shaped folding arms each having two upper ends pivotally connected to the two first supporting arms respectively and adapted to pivotally fold between a folded position and a fully unfolded position, wherein in the folded position, the two folding arms are pivotally folded towards each other, and in the fully unfolded position, each of the folding arms is pivotally folded outwardly to define an unfolded angle between the folding arm and the supporting frame;

means for retaining each of the folding arms at the unfolded angle; and a securing device comprising a pair of first secure units attached to two bottom portions of the folding arms respectively and a pair of second secure units attached to the two second supporting arms of the supporting frame respectively, wherein the first secure units are detachably connected to the second secure units respectively to retain an unfolded distance between the two bottom portions of the folding arms.

DETAILED DESCRIPTION OF THE PREFERRED EMBODIMENT

Figure 1:
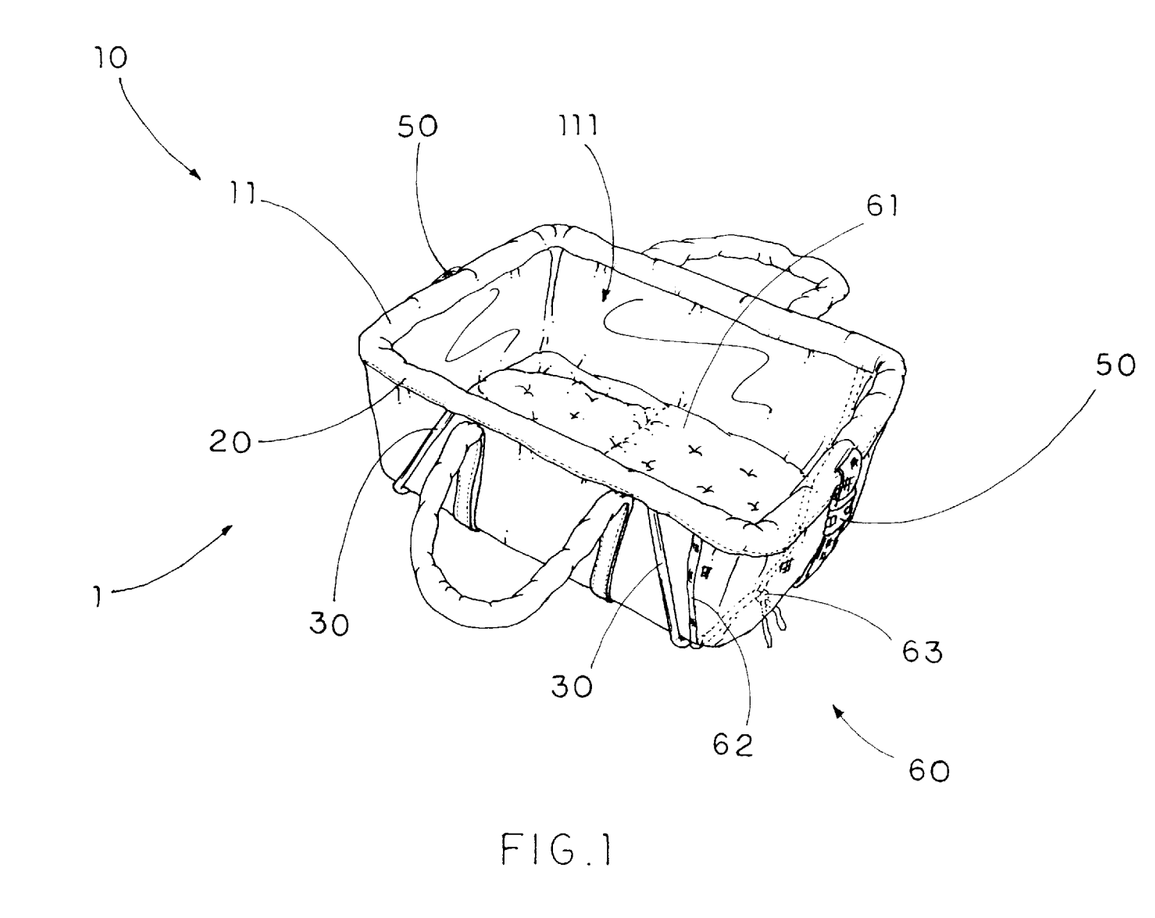
FIG. 1 is a perspective view of a foldable frame incorporated with a bassinet according to a first preferred embodiment of the present invention.
Figure 2:
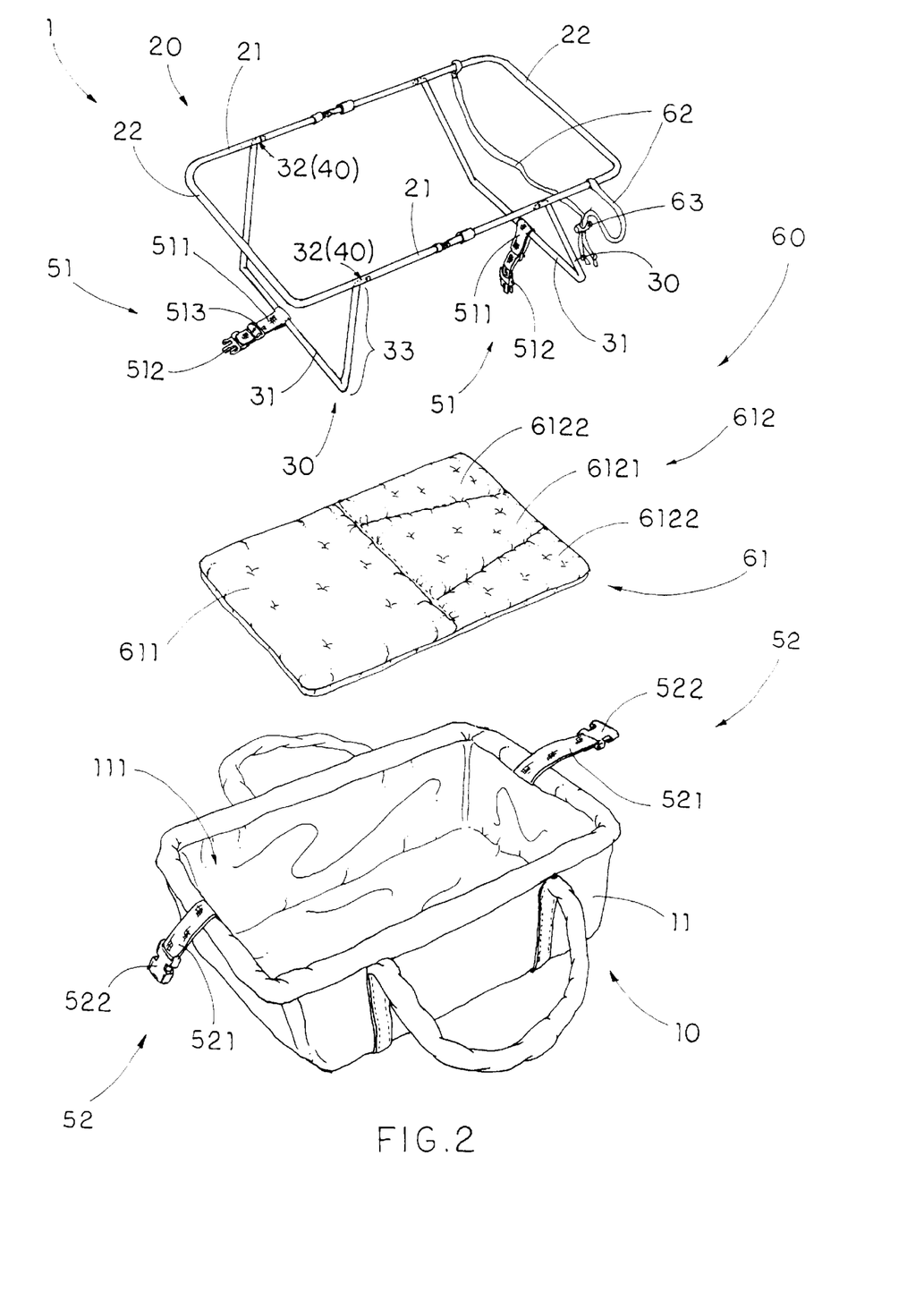
FIG. 2 is an exploded perspective view of the bassinet with the foldable frame according to the above first preferred embodiment of the present invention.

Referring to FIGS. 1 and 2 of the drawings, a foldable frame 1 specifically incorporated with a bassinet 10 according to a first preferred embodiment of the present invention.

The foldable frame 1 comprises a supporting frame 20 and a pair of U-shaped folding arms 30. The supporting frame 20 comprises a pair of first supporting arms 21 arranged in a parallel manner and a pair of second supporting arms 22 which are connected to the first supporting arms 21 ends to ends respectively to form a boundary frame structure. Each of the pair of U-shaped folding arms 30 has two upper ends pivotally connected to the two first supporting arms 21 respectively so as to pivotally fold between a folded position and a fully unfolded position.

Figure 3A:
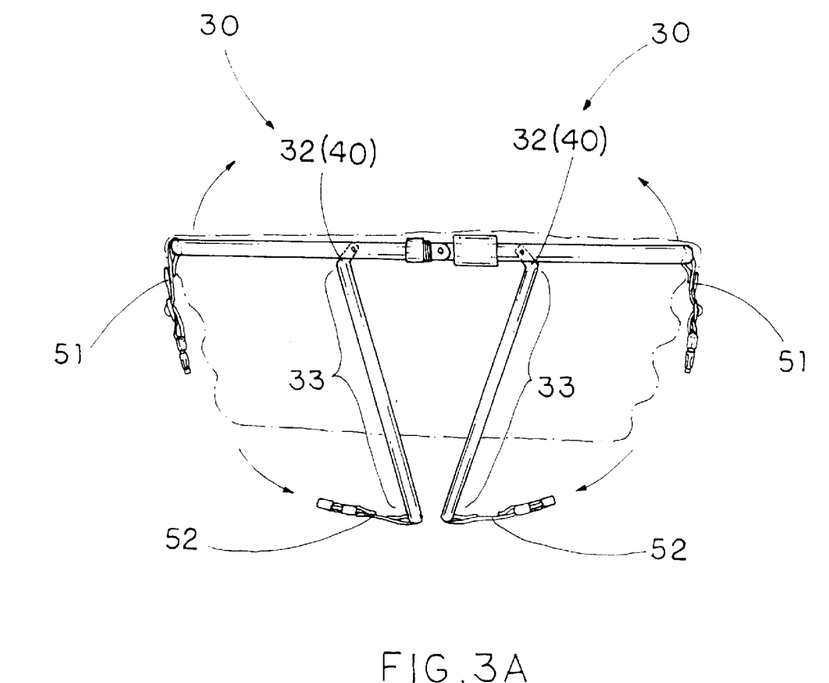
FIG. 3A is a side view of the foldable frame in a folded position according to the above first preferred embodiment of the present invention.
Figure 3B:
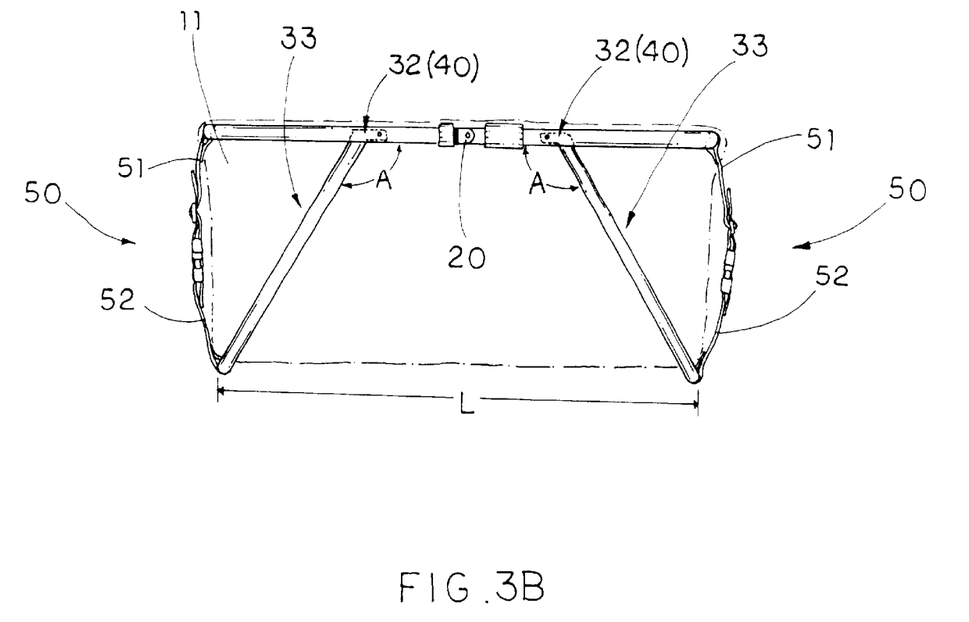
FIG. 3B is a side view of the foldable frame in a fully unfolded position according to the above first preferred embodiment of the present invention.

In the folded position, as shown in FIG. 3A, the two folding arms 30 are pivotally folded towards each other, and in the fully unfolded position, as shown in FIG. 3B, each of the folding arms 30 is pivotally folded outwardly to define an unfolded angle A between the folding arm 30 and the supporting frame 20.

The foldable frame 1 further comprises means 40 for retaining each of the folding arms 30 at the unfolded angle A and a securing device 50 attached between each of the bottom portions 31 of the folding arms 30 and each of the second supporting arms 22 of the supporting frame 20 to retain an unfolded distance L between the two bottom portions 31 of the folding arms 30.

According to the first preferred embodiment, the bassinet 10 comprises a fabric made boundary shelter 11 having a receiving cavity 111 supported within the supporting frame 20 of the foldable frame 1 wherein top edge portions of the boundary shelter 11 are held by the first and second supporting arms 21, 22 in position. The receiving cavity 111 of the boundary shelter 11 has a depth smaller than a height of each of the folding arms 30 such that a bottom wall 112 of the boundary shelter 11 is supported on the bottom portions 31 of the folding arms 30 in the fully unfolded position.

As shown in FIG. 2, the first supporting arms 21 are integrally connected to the second supporting arms 22 end to end to form a rectangular structure that also supports the boundary shelter 11 of the bassinet 10 in a corresponding rectangular shape. Accordingly, the supporting frame 10 can further employ a pair of folding joints provided at midportion of the first supporting arms 21 respectively so that the supporting frame 10 can be further folded up in half by means of the folding joints.

Each of the folding arms 30 is adapted to outwardly and inclinedly fold with respect to the first supporting arms 21 of the supporting frame 20 in a pivotally movable manner wherein the unfolded angle A between each of the folding arms 30 and the supporting frame 10 must be at least equal to 90 degrees in the fully unfolded position, as shown in FIG. 3B.

The securing device 50 comprises a pair of first secure units 51 attached to two bottom portion 31 of the folding arms 30 respectively and a pair of second secure units 52 attached to the two second supporting arms 22 of the supporting frame 20 respectively, wherein the first secure units 51 are detachably connected to the second secure units 52 respectively.

Accordingly, each of the first secure units 51 of the securing device 50 comprises a first extension strap 511 having one end affixed to the bottom portion 31 of the folding arm 30 and a first attachment member 512 affixed to a free end of the extension strap 511. Each of the second secure units 51 comprises a second extension strap 521 having one end attached to the respective top edge portion of the boundary shelter 11 and a second attachment member 522 affixed to a free end of the second extension strap 521 in such a manner that when the boundary shelter 11 is mounted to the foldable frame 1, i.e. the top edge portions of the boundary shelter 11 mounted on the supporting frame 10, the first attachment member 512 is detachably attached to the second attachment member 522 so as to retain the unfolded distance between the two bottom portions 31 of the folding arms 30.

Moreover, the securing device 50 can securely attach the boundary shelter 11 of the bassinet 10 to the foldable frame 1 by securely attaching the first attachment member 512 to the second attachment member 522. It is worth to mention that the boundary shelter 11 can be detached from the foldable frame 1 of the present invention for cleaning purpose by simply detaching the first attachment member 512 from the second attachment member 522.

Accordingly, the first and second attachment members 512, 522 are a buckle plug and a buckle socket respectively to provide a quick and easy attachment therebetween. It is obvious that the first and second secure units 51, 52 can be substituted by other fasteners such as belts or loop and hoop fasteners in order to lock up the folding arms 30 in the fully unfolded position.

The first secure unit 51 further comprises an adjustable member 513 slidably mounted on the first extension strap 511 for selectively adjusting an extending length of the first extension strap 511 extending from the bottom portion 31 of the folding arm 30 to the first attachment member 512. Therefore, by adjusting the extending length of the first extension strap 511, the folding arm 30 can be securely locked up with the supporting frame 20 at the fully unfolded position in a tension tight manner, so as to prevent the folding arm 30 from being pivotally folded inward accidentally.

Figure 4:
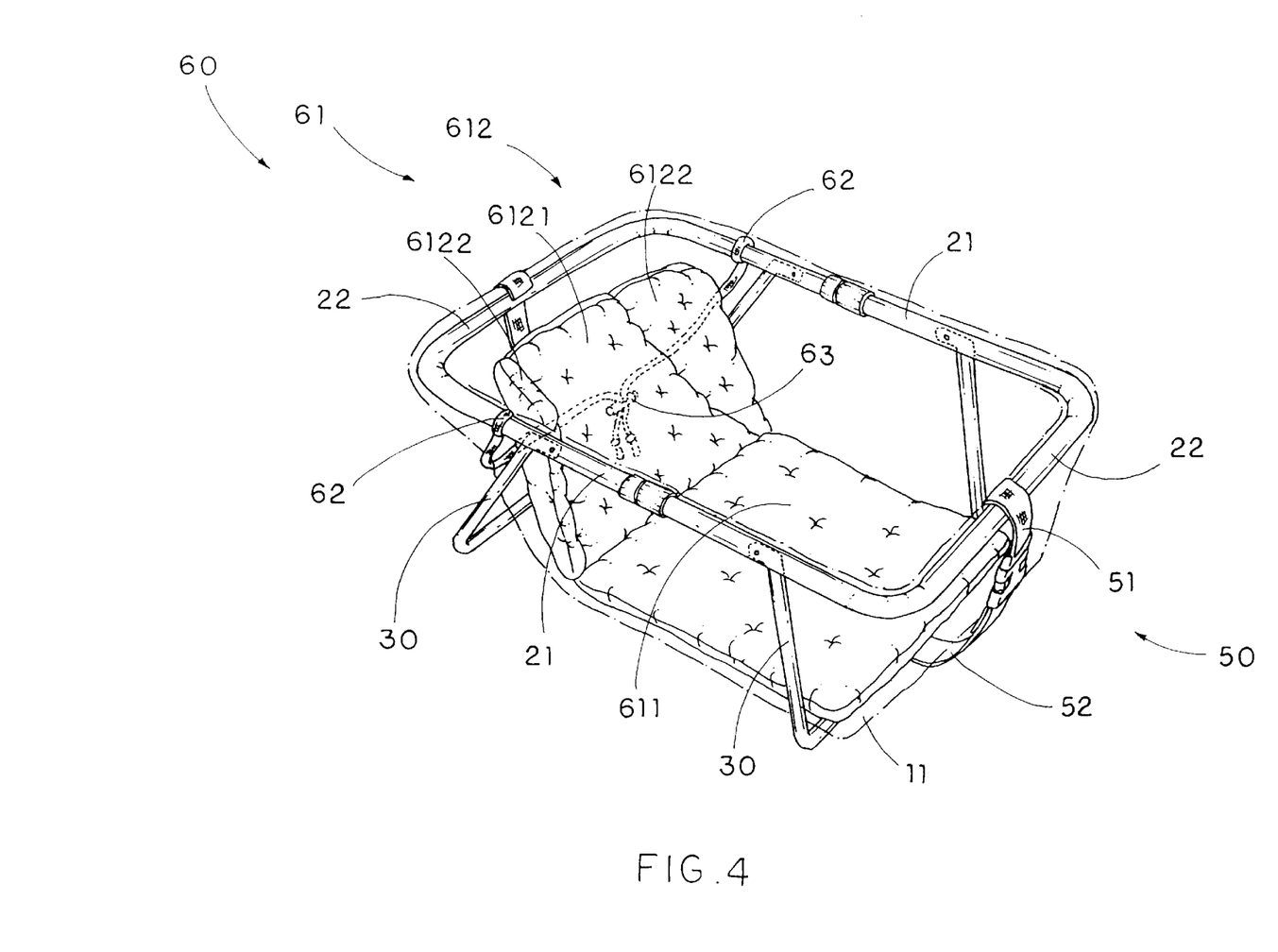
FIG. 4 is a perspective view of an adjustable back support arrangement of the foldable frame for the bassinet according to the above first preferred embodiment of the present invention.

The foldable frame 1 further comprises an adjustable back support arrangement 60 for bassinet 10 wherein the adjustable back support arrangement 60 comprises a supporting board 61, adapted for disposing in the receiving cavity 111 of the boundary shelter 11, two elongated elements 62 extended from the first supporting arms 21 to a bottom side of the supporting board 61, and a inclination locker 63 for selectively and securely locking up the two elongated elements 62 together for adjusting control lengths of the two elongated elements 62 extending between the first supporting arms 21 and the inclination locker 63 so as to lift up the supporting board 61 in an inclined manner, as shown in FIG. 4.

As shown in FIG. 2, the supporting board 61 is embodied to have a seat support portion 611 and a back support portion 612 foldably extended from the seat support portion 611. The back support portion 612 of the supporting board 61 further defines a central section 6121 and two side sections 6122 foldably extended from two sides of the central section 6121.

The two elongated elements 62, which are embodied as two durable strings, each has an affixing end attached to the respective first supporting arm 21 or the top edge portion of the boundary shelter 11 and a free end arranged to extended underneath the back support portion 612 of the supporting board 61 to slidably mount to the inclination locker 63 underneath the bottom wall 112 of the boundary shelter 11.

The inclination locker 63 is slidably mounted to the two elongated elements 62 in such a manner that the inclination locker 62 is adapted to slidably lock at different positions of the two elongated elements 62 to adjust the control length of each of the elongated elements 62 extended between the respective first supporting arm 21 and the inclination locker 63.

Therefore, by selectively shortening the control lengths of the two elongated elements 62 extending between the first supporting arms 21 and the inclination locker 63, the head support portion 612 will be lifted up inclinedly with respect to the body support portion 611, so that the user, such as a baby, is able to lie in the receiving cavity 111 inclinedly, as shown in FIG. 4. In other words, the control lengths of the two elongated element 62 can adjust an inclined angle of the back support portion 612 with respect to the seat support portion 611. Moreover, the two side sections 6122 will be folded upwardly with respect to the central section 6121 for supporting two sides of the user's head so as to prevent an unwanted lateral head movement of the user.

It is obvious that the two affixing ends of the two elongated elements 62 are adapted for affixing to two respective side edges of the bottom wall 112 of the boundary shelter 11 in order to control the folding movements of the two side sections 6122 of the supporting board 61 only by adjusting the control length of each of the elongated elements 62 extended between the inclination locker 63 and the respective side edge of the bottom wall 112 of the boundary shelter 11.

Figure 5:
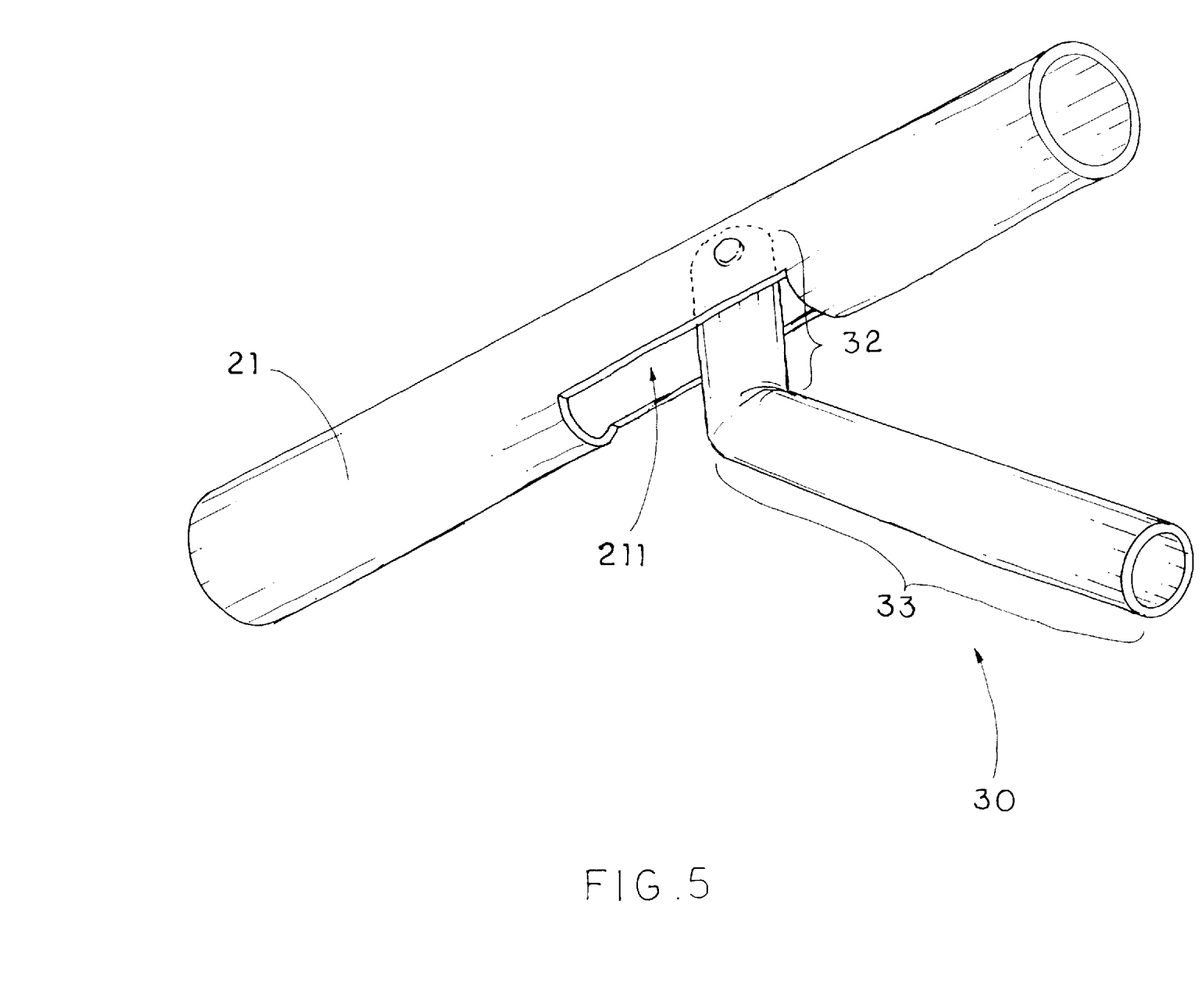
FIG. 5 is a perspective view of a retaining means of the foldable frame according to the above first preferred embodiment of the present invention.

As shown in FIG. 5, each of the folding arms 30 has two biasing end portions 32 (which function as the retaining means 40) pivotally connected to the first supporting arms 21 respectively and a U-shaped support portion 33 inclinedly extended from the biasing end portions 32 wherein the folding arm 30 is adapted to fold into the fully unfolded position when the biasing end portions 32 thereof are biased against the first supporting arms 21 respectively and the support portion 33 of the folding arm 30 is suspendedly extended from the first supporting arm 21 at the unfolded angle A.

In order to pivotally connect the biasing end portion 32 of the folding arm 30 to the first supporting arm 21, the first supporting arm 21 has an elongated guiding slot 211 formed on a bottom side thereof, wherein the biasing end portion 32 of the folding arm 30 is pivotally connected between two sidewalls of the guiding slot 211 in such a manner that the folding arm 30 is capably of freely folding in a pivotally movable manner until the biasing end portion 32 thereof biases against a ceiling of the guiding slot 211, i.e. the inner top side of the first supporting arm 21, as shown in FIG. 4. In other words, the biasing end portion 32 of the folding arm 30 will limit the unfolded angle thereof so as to retain the folding arms 30 in the fully unfolded position.

Figure 6:
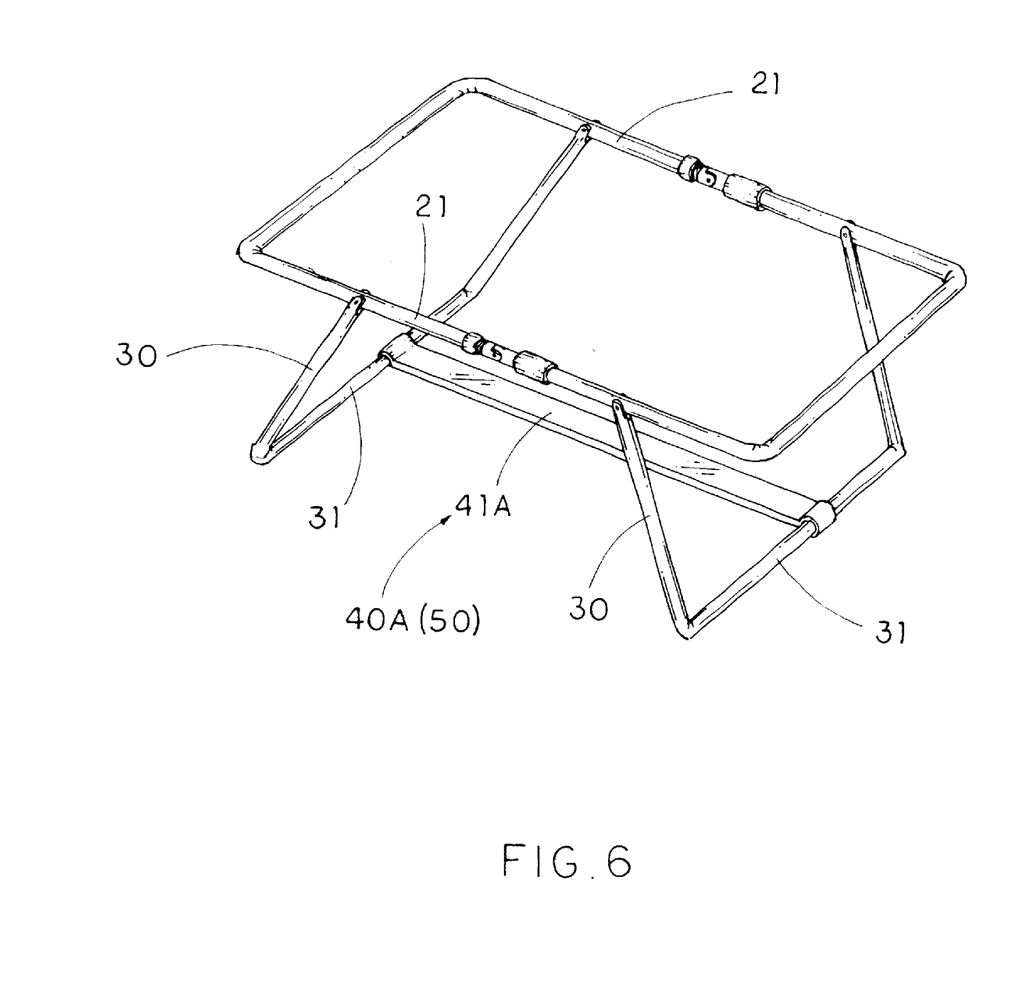
FIG. 6 illustrates an alternative mode of the retaining means of the foldable frame according to the above first preferred embodiment of the present invention.

FIG. 6 illustrates an alternative mode of the retaining means 40A which comprises an elongated rigid member 41A having two ends detachably connected to the bottom portions 31 of the folding arms 30 respectively so as to retain the unfolded angles of the two folding arms 30 with respect to the supporting arms 21. It is worth to mention that the elongated rigid member 41A of the retaining means 40A can functions as the securing device 50 to retain the unfolded distance between the two bottom portions 31 of the folding arms 30 by means of the length of the elongated rigid member 41A.

Figure 7:
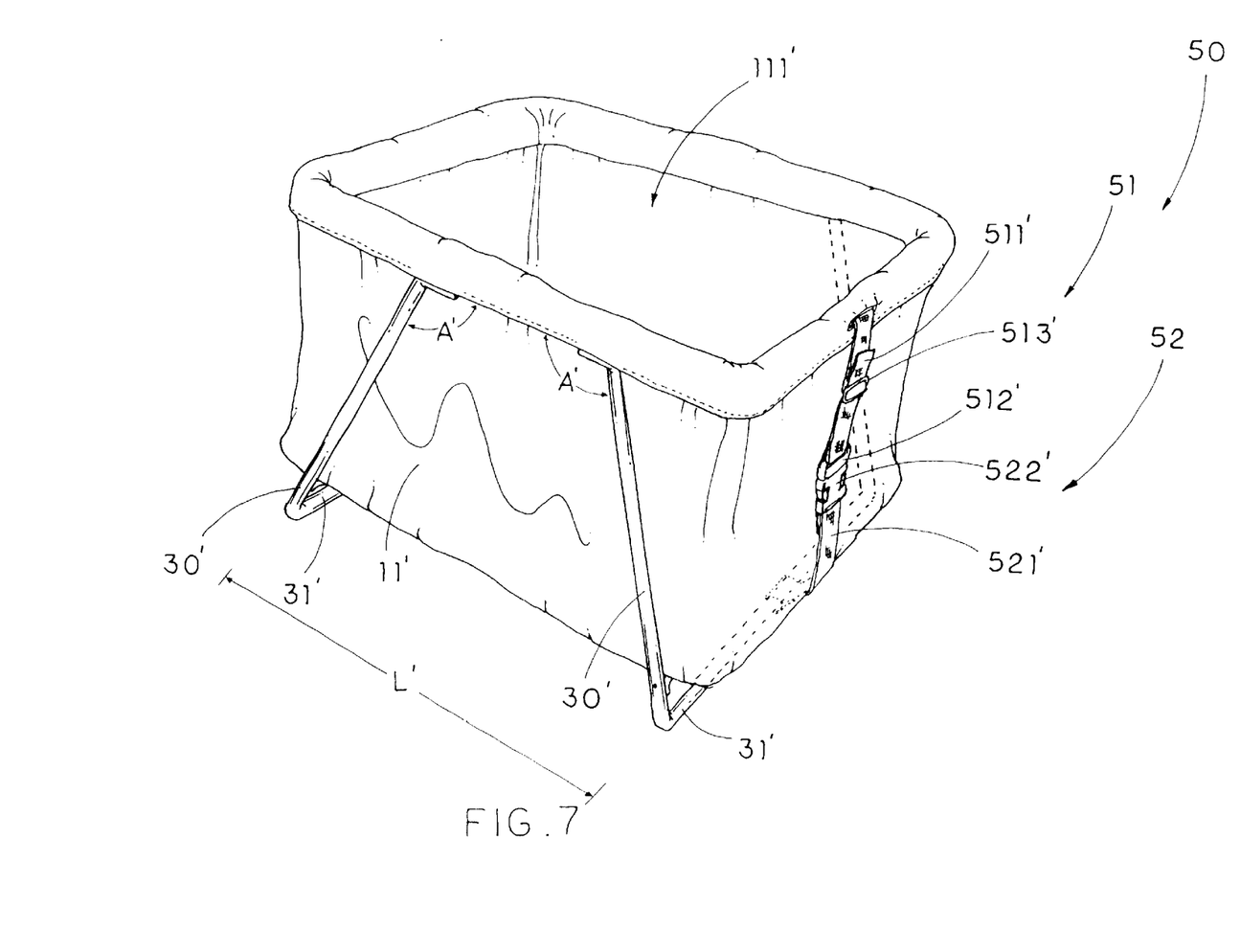
FIG. 7 is a perspective view of a foldable frame incorporated with a playpen according to a second preferred embodiment of the present invention.

Referring to FIG. 7, a second embodiment of the foldable frame 1' illustrates an alternative mode of the first embodiment of the present invention, wherein the foldable frame 1' of the second embodiment is specifically incorporated with a playpen 10'.

The foldable frame 1' of the second embodiment, has the same structure of the first embodiment, which comprises a supporting frame 20' comprising a pair of first supporting arms 21' in a parallel manner and a pair of second supporting arms 22' connected to the first supporting arms 21' end to end respectively and a pair of U-shaped folding arms 30' each having two upper ends pivotally connected to the two first supporting arms 21' respectively and adapted to pivotally fold between a folded position and a fully unfolded position.

In the folded position, the two folding arms 30' are pivotally folded towards each other, and in the fully unfolded position, each of the folding arms 30' is pivotally folded outwardly to define an unfolded angle A' between the folding arm 30' and the supporting frame 20'.

The foldable frame 1' further comprises means 40' for retaining each of the folding arms 30' at the unfolded angle A' and a securing device 50' comprising a pair of first secure units 51' attached to two bottom portion 31' of the folding arms 30' respectively and a pair of second secure units 52' attached to the two second supporting arms 22' of the supporting frame 20' respectively, wherein the first secure units 51' are detachably connected to the second secure units 52' respectively to retain an unfolded distance L between the two bottom portions 31' of the folding arms 30'.

The playpen 10' comprises a fabric made boundary shelter 11' having a receiving cavity 111' supported within the supporting frame 20' of the foldable frame 11' wherein top edge portions of the boundary shelter 11' are securely affixed to the first and second supporting arms 21', 22' by stitching. The receiving cavity 11' of the boundary 11' has a depth smaller than a height of each of the folding arms 30' such that a bottom wall 112' of the boundary shelter 11' is supported on the bottom portions 31' of the folding arms 30' in the fully unfolded position.

Each of the first secure units 51' of the securing device 50' comprises a first extension strap 511' having one end affixed to the bottom portion 31' of the folding arm 30' and a first attachment member 512' affixed to a free end of the extension strap 511. Each of the second secure units 51' comprises a second extension strap 521' having one end attached to the respective second supporting arm 22' of the supporting frame and a second attachment member 522' affixed to a free end of the second extension strap 521' wherein the first attachment member 512' is detachably attached to the second attachment member 522' so as to retain the unfolded distance between the two bottom portions 31' of the folding arms 30'.

The first secure unit 51' further comprises an adjustable member 513' slidably mounted on the first extension strap 511' for selectively adjusting an extending length of the first extension strap 511' extending from the bottom portion 31' of the folding arm 30' to the first attachment member 512'.

Figure 8:
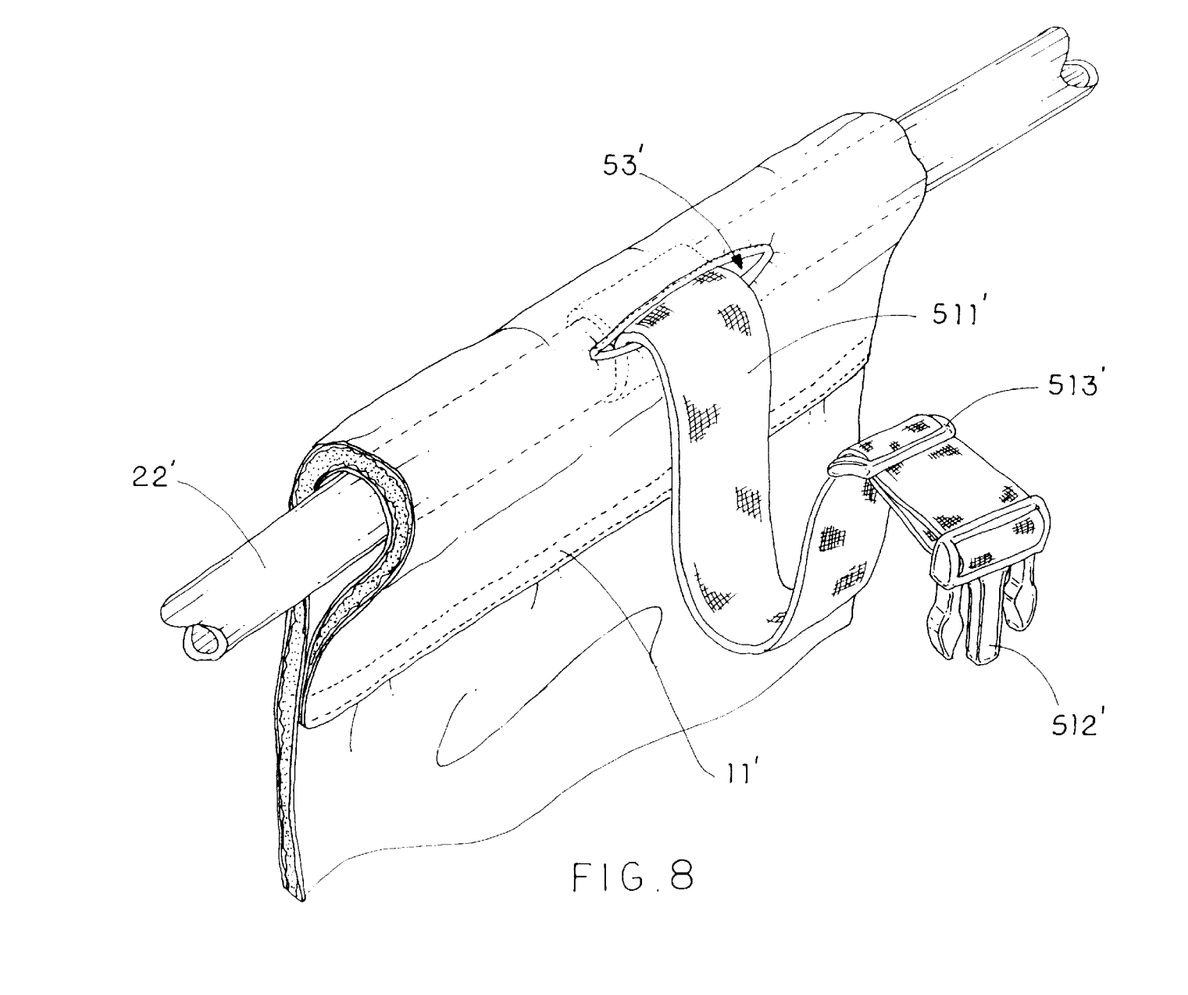
FIG. 8 is a partial perspective view of the playpen incorporated with the foldable frame according to the second preferred embodiment of the present invention.

As shown in FIG. 8, the securing device 50' further has a pair of elongated through slits 53' formed on two respective top edge portions of the boundary shelter 11' wherein the second secure units 52' are arranged to slidably pass through the through slits 53' respectively to detachably attach to the first secure unit 51'. Therefore, securing device 50' can firmly hold the boundary shelter 11' of the playpen 1' in position.

Figure 9:
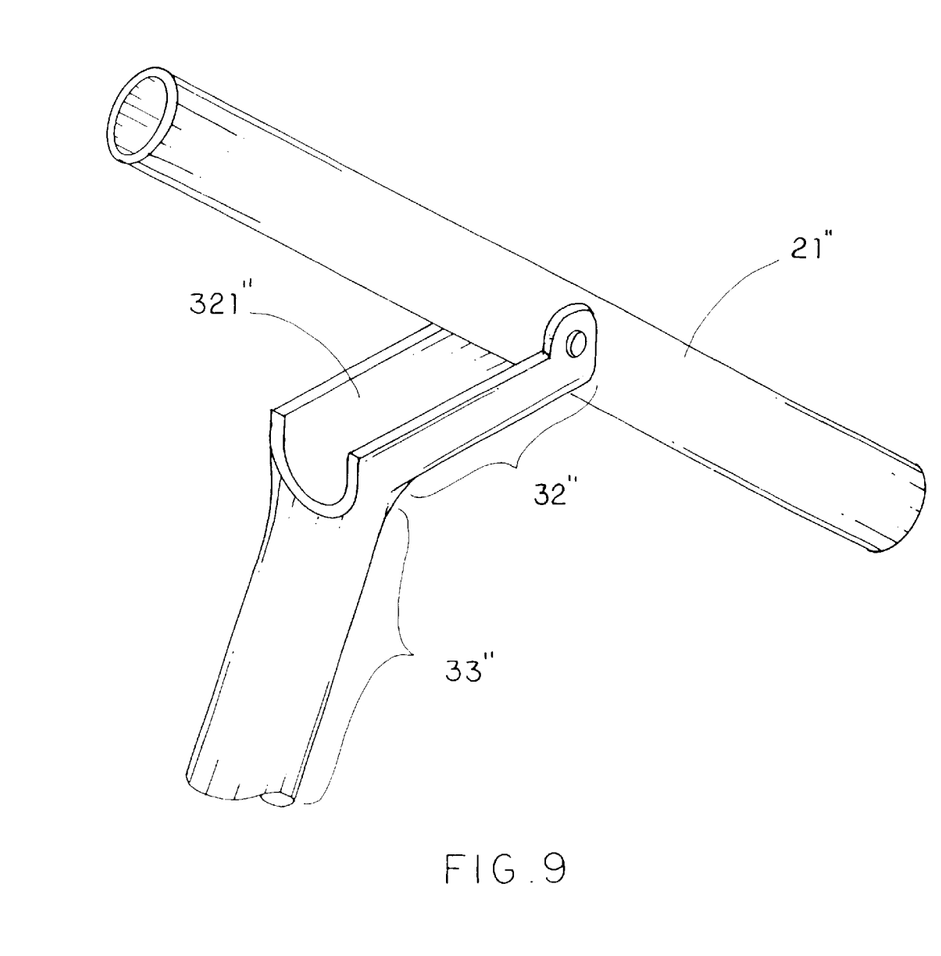
FIG. 9 is a perspective view of the retaining means of the foldable frame according to the above second preferred embodiment of the present invention.

As shown in FIG. 9, each of the folding arms 30' has two biasing end portions 32' (which function as the retaining means 40') pivotally connected to the first supporting arms 21' respectively and a support portion 33' inclinedly extended from the biasing end portions 32' wherein the folding arm 30' is adapted to fold into the fully unfolded position when the biasing end portions 32' thereof is biased against the first supporting arms 21' respectively and the support portion 33' of the folding arm 30' is suspendedly extended from the first supporting arm 21' at the unfolded angle A'.

Accordingly, each of the biasing end portion 32' of the folding arm 30' has a U-shaped cross section to define an inner biasing surface 321' which is arranged to fittingly bias against a circumferential of the respective first supporting arm 21' of the supporting frame 20' in the fully unfolded position.

It is worth to mention that since the playpen 1' is used for supporting a user, such as a young child having a relative heavy weight, in the receiving cavity 111' of the boundary shelter 11', the pivot connection between the folding arms 30' and the supporting frame 20' must be strong enough to substantially support a downward force of the user's weight distributed on the foldable frame 1'. Therefore, the structure of the biasing end portion 32' of the folding arm 20' as disclosed above can provide a rigid support to the supporting frame 20' in a pivotally movable manner. It should be appreciated that the rigid structure of the biasing end portion 32' of the foldable arm 20' of the second embodiment can fit for the bassinet 1 of the first embodiment since the bassinet 1 is mainly used for supporting a user who has a relatively light weight such as a baby. In other words, the guiding slot 211 of the first embodiment can be eliminated and substituted by the U-shaped biasing surface 321' of the second embodiment.

Figure 10:
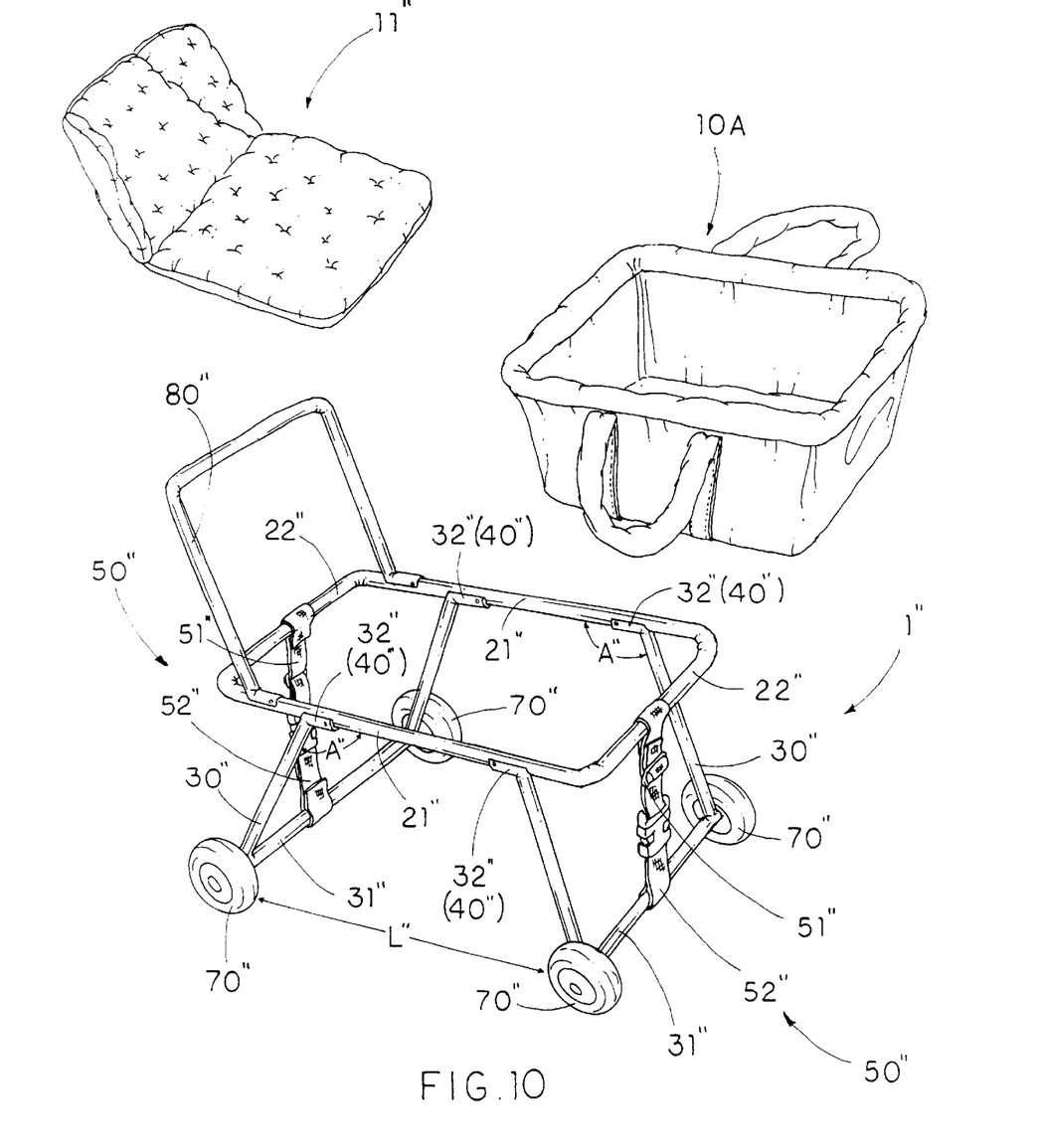
FIG. 10 is a perspective view of a foldable frame incorporated with a stroller according to a third preferred embodiment of the present invention.

Referring to FIG. 10, a third embodiment of the foldable frame 1" illustrates another alternative mode of the first embodiment of the present invention, wherein the foldable frame 1" of the third embodiment is specifically incorporated with a stroller 1".

As shown in FIG. 10, the foldable frame 1" also comprises a supporting frame 20" comprising a pair of first supporting arms 21" in a parallel manner and a pair of second supporting arms 22" connected to the first supporting arms 21" end to end respectively and a pair of U-shaped folding arms 30" each having two upper ends pivotally connected to the two first supporting arms 21" respectively and adapted to pivotally fold between a folded position and a fully unfolded position.

In the folded position, the two folding arms 30" are pivotally folded towards each other, and in the fully unfolded position, each of the folding arms 30" is pivotally folded outwardly to define an unfolded angle A" between the folding arm 30" and the supporting frame 20".

The foldable frame 1" further comprises means 40" for retaining each of the folding arms 30" at the unfolded angle A" and a securing device 50" comprising a pair of first secure units 51" attached to two bottom portion 31" of the folding arms 30" respectively and a pair of second secure units 52" attached to the two second supporting arms 22" of the supporting frame 20" respectively, wherein the first secure units 51" are detachably connected to the second secure units 52" respectively to retain an unfolded distance L between the two bottom portions 31" of the folding arms 30".

Preferably, each of the biasing end portions 32" of the folding arms 30" (which is the retaining means 40") has the same structure of the second embodiment to have a U-shaped cross section, as shown in FIG. 9, for substantially biasing against the respective first supporting arm 21".

The stroller 1" comprises a seat arrangement 11" for supporting the user thereon wherein the seat arrangement 11" can be securely mounted to the supporting frame 20". Accordingly, the foldable frame 1" further comprises two pairs of wheels 70" rotatably mounted to two outer sides of the bottom portions of the two folding arms 30" respectively and a handle frame 80" upwardly extended from the supporting frame 20". In other words, the foldable frame 1" of the third embodiment can be constructed as a stroller frame. Moreover, the foldable frame 1" can be a shopping cart when a bassinet 10A is supported by the foldable frame 1" as shown in FIG. 10.

What is claimed is:

1. A foldable frame, comprising:

a supporting frame comprising two first supporting arms and two second supporting arms which are connected between said two first supporting arms to form a surrounding frame structure;

a pair of U-shaped folding arms each having a bottom portion and two upper ends pivotally connected to said two first supporting arms respectively in such a manner that each of said folding arms is capable of pivotally folding between a folded position and a fully unfolded position, wherein in said folded position, said two folding arms are pivotally folded towards each other and said supporting frame, wherein in said fully unfolded position, said two folding arms are pivotally folded away from each other and outwardly from said supporting frame, wherein an unfolded angle is defined between each of said folding arms and said supporting frame and a receiving space is defined between said supporting frame and said two unfolded folding arms;

means for retaining each of said folding arms at said unfolded angle;

a boundary shelter, having a receiving cavity, which top edge portions are held in position by said surrounding frame structure so as to support said boundary shelter within said receiving space defined between said supporting frame and said two unfolded folding arms; and a securing device detachably connecting said bottom portions of said folding arms with said second supporting arms of said supporting frame respectively so as to retain an unfolded distance between said two bottom portions of said folding arms and said supporting frame, wherein said securing device comprises a pair of first secure units attached to said two bottom portions of said folding arms respectively and a pair of second secure units attached to said two second supporting arms of said supporting frame respectively, wherein said first secure units are detachably connected to said second secure units respectively, wherein each of said first secure units comprises a first extension strap having one end affixed to said respective bottom portion of said folding arm and a first attachment member affixed to a free end of said extension strap, and each of said second secure units comprises a second attachment member arranged to detachably connect to said first attachment member and a second extension strap having one end attached to said second attachment member and another end attached to said respective top edge portion of said boundary shelter mounted on said respective second supporting arm of said supporting frame.

2. A foldable frame, as recited in claim 1, wherein said retaining means comprises four biasing end portions provided at said our upper ends of said two folding arms respectively, wherein each of said folding arms further comprises a support portion inclinedly extended between one end of said bottom portion and said respective biasing end portion, wherein said folding arm is adapted to fold into said fully unfolded position when said biasing end portions thereof are biased against said first supporting arms respectively and said support portion of said folding arm is extended from said first supporting arm at said unfolded angle.

3. A foldable frame, as recited in claim 2 wherein said first supporting arm has a guiding slot formed on a bottom side thereof, wherein each of said biasing end portions of said folding arm is pivotally connected between two sidewalls of said guiding slot, wherein said folding arm is freely folded in a pivotally movable manner until said biasing end portion thereof biases against a ceiling of said guiding slot which is an inner top side of said first supporting arm.

4. A foldable frame, as recited in claim 2, wherein each of said biasing end portions of said folding arm has a U-shaped cross section to define an inner biasing surface which is arranged to fittingly bias against a circumferential surface of said respective first supporting arm of said supporting frame in said fully unfolded position.

5. A foldable frame, as recited in claim 2, further comprising an adjustable back support arrangement which comprises a supporting board disposed in said receiving cavity of said boundary shelter, two elongated elements extended from said first supporting arms to a bottom side of said supporting board, and an inclination locker for selectively and securely locking up said two elongated elements together for adjusting control lengths of said two elongated elements extending between said first supporting arms and said inclination locker so as to adjustably lift up said supporting board in an inclined manner.

6. A foldable frame, as recited in claim 3, further comprising an adjustable back support arrangement which comprises a supporting board disposed in said receiving cavity of said boundary shelter, two elongated elements extended from said first supporting arms to a bottom side of said supporting board, and an inclination locker for selectively and securely locking up said two elongated elements together for adjusting control lengths of said two elongated elements extending between said first supporting arms and said inclination locker so as to adjustably lift up said supporting board in an inclined manner.

7. A foldable frame, as recited in claim 5, wherein said supporting board has a seat support portion and a back support port on which is foldably extended from said seat support portion and has a central section and two side sections foldably extended from two sides of said central section, wherein said two elongated elements are respectively extended underneath said back support portion so as to adjust an inclined angle of said back support portion with respect to said seat support portion and folding positions of said two side sections with respect to said central section.

8. A foldable frame, as recited in claim 6, wherein said supporting board has a seat support portion and a back support portion which is foldably extended from said seat support portion and has a central section and two side sections foldably extended from two sides of said central section, wherein said two elongated elements are respectively extended underneath said back support portion so as to adjust an inclined angle of said back support portion with respect to said seat support portion and folding positions of said two side sections with respect to said central section.

9. A foldable frame, comprising:

a supporting frame comprising two first supporting arms and two second supporting arms which are connected between said two first supporting arms to form a surrounding frame structure;

a pair of U-shaped folding arms each having a bottom portion and two upper ends pivotally connected to said two first supporting arms respectively in such a manner that each of said folding arms is capable of pivotally folding between a folded position and a fully unfolded position, wherein in said folded position, said two folding arms are pivotally folded towards each other and said supporting frame, wherein in said fully unfolded position, said two folding arms are pivotally folded away from each other and outwardly from said supporting frame, wherein an unfolded angle is defined between each of said folding arms and said supporting frame and a receiving space is defined between said supporting frame and said two unfolded folding arms;

means for retaining each of said folding arms at said unfolded angle;

a boundary shelter, having a receiving cavity, which top edge portions are held in position by said surrounding frame structure so as to support said boundary shelter within said receiving space defined between said supporting frame and said two unfolded folding arms; and a securing device detachably connecting said bottom portions of said folding arms with said second supporting arms of said supporting frame respectively so as to retain an unfolded distance between said two bottom portions of said folding arms and said supporting frame, wherein said securing device comprises a pair of first secure units attached to said two bottom portions of said folding arms respectively and a pair of second secure units attached to said two second supporting arms of said supporting frame respectively, wherein said first secure units are detachably connected to said second secure units respectively, wherein each of said first secure units comprises a first extension strap having one end affixed to said respective bottom portion of said folding arm and a first attachment member affixed to a free end of said extension strap, and each of said second secure units comprises a second attachment member arranged to detachably connect to said first attachment member and a second extension strap having one end attached to said second attachment member and another end attached to said respective second supporting arm and slidably passed through an elongated through slit formed on said respective top edge portion of said boundary shelter attached on said respective second supporting arm.

10. A foldable frame, as recited in claim 9, wherein said retaining means comprises four biasing end portions provided at said four upper ends of said two folding arms respectively, wherein each of said folding arms further comprises a support portion inclinedly extended between one end of said bottom portion and said respective biasing end portion, wherein said folding arm is adapted to fold into said fully unfolded position when said biasing end portions thereof are biased against said first supporting arms respectively and said support portion of said folding arm is extended from said first supporting arm at said unfolded angle.

11. A foldable frame, as recited in claim 10, wherein said first supporting arm has a guiding slot formed on a bottom side thereof, wherein each of said biasing end portions of said folding arm is pivotally connected between two sidewalls of said guiding slot, wherein said folding arm is freely folded in a pivotally movable manner until said biasing end portion thereof biases against a ceiling of said guiding slot which is an inner top side of said first supporting arm.

12. A foldable frame, as recited in claim 10, wherein each of said biasing end portions of said folding arm has a U-shaped cross section to define an inner biasing surface which is arranged to fittingly bias against a circumferential surface of said respective first supporting arm of said supporting frame in said fully unfolded position.

13. A foldable frame, comprising:

a supporting frame comprising two first supporting arms and two second supporting arms which are connected between said two first supporting arms to form a surrounding frame structure;

a pair of U-shaped folding arms each having a bottom portion and two upper ends pivotally connected to said two first supporting arms respectively in such a manner that each of said folding arms is capable of pivotally folding between a folded position and a fully unfolded position, wherein in said folded position, said two folding arms are pivotally folded towards each other and said supporting frame, wherein in said fully unfolded position, said two folding arms are pivotally folded away from each other and outwardly from said supporting frame, wherein an unfolded angle is defined between each of said folding arms and said supporting frame and a receiving space is defined between said supporting frame and said two unfolded folding arms;

means for retaining each of said folding arms at said unfolded angle;

a securing device detachably connecting said bottom portions of said folding arms with said second supporting arms of said supporting frame respectively so as to retain an unfolded distance between said two bottom portions of said folding arms and said supporting frame; and a boundary shelter, having a receiving cavity, which top edge portions are held in position by said surrounding frame structure so as to support said boundary shelter within said receiving space defined between said supporting frame and said two unfolded folding arms;

wherein said retaining means comprises four biasing end portions provided at said four upper ends of said two folding arms respectively, wherein each of said folding arms further comprises a support portion inclinedly extended between one end of said bottom portion and said respective biasing end portion, wherein said folding arm is adapted to fold into said fully unfolded position when said biasing end portions thereof are biased against said first supporting arms respectively and said support portion of said folding arm is extended from said first supporting arm at said unfolded angle;

wherein each of said biasing end portions of said folding arm has a U-shaped cross section to define an inner biasing surface which is arranged to fittingly bias against a circumferential surface of said respective first supporting arm of said supporting frame in said fully unfolded position.

\* \* \* \* \*